United States Patent
Yao et al.

(10) Patent No.: US 10,050,836 B2
(45) Date of Patent: Aug. 14, 2018

(54) METHODS AND APPARATUSES FOR FUNCTION COORDINATION CONTROL

(71) Applicant: NOKIA SOLUTIONS AND NETWORKS OY, Espoo (FI)

(72) Inventors: Yizhi Yao, Beijing (CN); Haitao Tang, Espoo (FI); Clemens Suerbaum, Munich (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 185 days.

(21) Appl. No.: 14/431,543

(22) PCT Filed: Sep. 27, 2012

(86) PCT No.: PCT/CN2012/082170
§ 371 (c)(1),
(2) Date: Mar. 26, 2015

(87) PCT Pub. No.: WO2014/047835
PCT Pub. Date: Apr. 3, 2014

(65) Prior Publication Data
US 2015/0271025 A1    Sep. 24, 2015

(51) Int. Cl.
*H04L 12/24* (2006.01)
*H04W 24/02* (2009.01)
(Continued)

(52) U.S. Cl.
CPC .......... *H04L 41/0893* (2013.01); *H04L 67/12* (2013.01); *H04W 24/02* (2013.01); *H04W 84/18* (2013.01)

(58) Field of Classification Search
CPC ... H04L 12/1407; H04L 12/244; H04L 29/06; H04L 41/0893; H04L 67/12;
(Continued)

(56) References Cited

U.S. PATENT DOCUMENTS

| | | | |
|---|---|---|---|
| 5,870,561 A * | 2/1999 | Jarvis | H04L 41/0893 379/221.06 |
| 2004/0202197 A1* | 10/2004 | Gao | H04L 29/06 370/469 |

(Continued)

FOREIGN PATENT DOCUMENTS

| | | |
|---|---|---|
| CN | 102056206 A | 5/2011 |
| WO | WO 2011/050753 A1 | 5/2011 |
| WO | WO 2012/110078 A1 | 8/2012 |

OTHER PUBLICATIONS

Lars Schmetz, et al.; "A Coordination Framework for Slef-Organisation in LTE Networks"; 12th IFIP/IEEE International Symposium on Integrated Network Management 2011; pp. 193-200.

(Continued)

*Primary Examiner* — Khoa Huynh
(74) *Attorney, Agent, or Firm* — Squire Patton Boggs (US) LLP

(57) ABSTRACT

Methods and apparatuses for SON and/or non-SON function coordination control have been provided. Specifically, embodiments have provided solutions for a second-party (e.g., operator), via an OAM interface like Itf-N or human interface, to control and manage a first-party (e.g., vendor) SCF, to ensure that the SCF makes coordination decisions on interacting SON functions according to the operator's requirements, even if the internal logic of the SCF is still not visible to the operator.

36 Claims, 3 Drawing Sheets

(51) Int. Cl.
*H04L 29/08* (2006.01)
*H04W 84/18* (2009.01)

(58) Field of Classification Search
CPC ..... H04W 24/02; H04W 24/04; H04W 24/10; H04W 84/18; H04W 24/20; H04W 24/22
See application file for complete search history.

(56) References Cited

U.S. PATENT DOCUMENTS

2009/0257353 A1* 10/2009 Song ............... H04W 24/02 370/241
2011/0096687 A1* 4/2011 Dottling ............ H04W 24/02 370/252

OTHER PUBLICATIONS

Tobias Bandh, et al.; "Policy-based Coordination and Management of SON Functions"; IEEE 2011; pp. 827-840.
S5-113659; Nokia Siemens Networks; "SON coordination: Conflicts and their categorization"; 3GPP TSG SA WG5 Meeting #80; Nov. 14-18, 2011; San Francisco, USA.
S5-122164; Huawei; "Enhancement of general SON coordination solutions"; 3GPP TSG-SA5 Meeting #84; Berlin, Germany, Aug. 20-24, 2012.
European Search Report application No. 12885459.3 dated Apr. 13, 2016.
International Search Report and Written Opinion dated May 23, 2013 corresponding to International Patent Application No. PCT/CN2012/082170.
3GPP TS 32.762 V11.3.0 (Sep. 2012), Technical Specification, 3rd Generation Partnership Project; Technical Specification Group Services and System Aspects; Telecommunication management; Evolved Universal Terrestrial Radio Access Network (E-UTRAN) Network Resource Model (NRM) Integration Reference Point (IRP); Information Service (IS) (Release 11), Sep. 2012, 56 pages.
3GPP TS 32.766 V11.2.0 (Sep. 2012), Technical Specification, 3rd Generation Partnership Project; Technical Specification Group Services and System Aspects; Telecommunication management; Evolved Universal Terrestrial Radio Access Network (E-UTRAN) Network Resource Model (NRM) Integration Reference Point (IRP); Solution Set (SS) definitions (Release 11), Sep. 2012, 48 pages.
3GPP TS 32.622 V11.0.0 (Sep. 2012), Technical Specification, 3rd Generation Partnership Project; Technical Specification Group Services and System Aspects; Telecommunication management; Configuration Management (CM); Generic network resources Integration Reference Point (IRP); Network Resource Model (NRM) (Release 11), Sep. 2012, 29 pages.
3GPP TS 32.526 V11.2.0 (Sep. 2012), Technical Specification, 3rd Generation Partnership Project; Technical Specification Group Services and System Aspects; Telecommunication management; Self-Organizing Networks (SON); Policy Network Resource Model (NRM) Integration Reference Point (IRP); Solution Set (SS) definitions (Release 11), Sep. 2012, 20 pages.
3GPP TS 32.522 V11.3.0 (Sep. 2012), Technical Specification, 3rd Generation Partnership Project; Technical Specification Group Services and System Aspects; Telecommunication management; Self-Organizing Networks (SON) Policy Network Resource Model (NRM) Integration Reference Point (IRP); Information Service (IS) (Release 11), Sep. 2012, 38 pages.

* cited by examiner

METHODS AND APPARATUSES FOR FUNCTION COORDINATION CONTROL

FIELD OF THE INVENTION

The example and non-limiting embodiments of the present invention generally relate to policy based function coordination, and more particularly, relate to methods, apparatuses, computer-readable storage medium and computer program products for control of self-organizing network (SON) and/or non-SON function coordination.

BACKGROUND OF THE INVENTION

This section introduces aspects that may help facilitate a better understanding of the invention(s). Accordingly, the statements of this section are to be read in this light and are not to be understood as admissions about what is in the prior art or what is not in the prior art.

The abbreviations and terms appearing in the description and drawings are defined as below.
3GPP Third Generation Partnership Project
ANR Automated Neighbor Relation
CCO Coverage & Capacity Optimization
COC Cell Outage Compensation
COD Cell Outage Detection
EM Element Manager
eNB enhanced NodeB, Base Station in E-UTRAN
E-UTRAN Evolved UTRAN
ICIC Inter-Cell Interference Coordination
IE Information Element
IOC Information Object Class
LTE Long Term Evolution
MDT Minimization of Drive Tests
MLB Mobility Load Balancing
MRO Mobility Robustness Optimization
NE Network Element
NM Network Manager
OAM Operation Administration and Maintenance
OPEX Operating Expense
PCI Physical Cell Identifier
SCF SON Coordination Function
SON Self-organizing Network Self-organizing Network (SON) is an operator-caring feature in 3GPP/2 for both Long Term Evolution (LTE) and the $3^{rd}$ Generation (3G) systems for reducing operating expense (OPEX) and some operators are even pushing it to 2G.

SON functions may be present in Network Element (NE, e.g., eNB), Element Manager (EM) and Network Manager (NM) levels of a network management structure. Thus, coordination of SON functions has to be supported across multiple levels.

A coordination method is helpful to avoid/resolve the negative impact brought by potentially conflicting individual SON functions. The coordination method could also help to support the needed interactions between some individual SON functions. Furthermore, the SON coordination method needs to make the specific coordination in line with operator's that is often defined by a set of policy or selections.

The SON coordination function (SCF) can be at NM level, at EM level, and also at NE (e.g., eNB) level. In case the SON coordination is at EM or NE level, operators have no way to know how the decision is made by the EM/NE-level SON coordination function for its conflicting SON functions, since the EM/NE-level SON coordination function is usually designed as vendor specific. The internal logic of this coordination function is usually neither seen nor yet controllable by operators. Thus, it presents a serious issue since different operators usually have different operational requirements and even a same operator can have different operational requirement at different time/circumstances.

SUMMARY OF THE INVENTION

Therefore, it would be desirable in the art to provide a solution where a first-party (e.g., vendors) entity may be controlled by a second-party (e.g., operators) entity. The first-party entity may be configured for network function coordination, and the internal logic of the network function coordination is unknown to the second-party entity. Specifically, it would be desirable to provide a solution by which the second-party entity can direct the first-party entity to make decisions according to the specific requirements of the second-party.

To better address one or more of the above concerns, in a first aspect of the invention, there is provided a method for use by a first-party entity within a communication network. The first-party entity is configured for SON and/or non-SON function coordination. The method may comprise: receiving, via an Operation Administration and Maintenance (OAM) interface, at least one instruction from a second-party entity within the communication network, wherein the at least one instruction indicates at least one policy to be used for the SON and/or non-SON function coordination; and performing the SON and/or non-SON function coordination based on the at least one policy.

In one embodiment, the method may further comprise: providing, prior to receiving the at least one instruction, a set of policies to the second-party entity for choosing to configure, and wherein one of the at least one instruction indicates at least one policy chosen from the set of policies. When the one of the at least one instruction indicates multiple policies, the at least one instruction may further indicate weights for each policy of the multiple policies.

Additionally, the at least one instruction may further indicate at least one attribute value configured for at least one of the chosen policies.

In another embodiment, the method may further comprise: agreeing in advance, with the second-party entity, on information elements for specifying policies to be used by the first-party entity; and wherein one of said at least one instruction indicates at least one policy by using said information elements, and said performing further comprising: parsing the instruction which uses said information elements into an executable command; and performing the executable command.

In yet another embodiment, the method may further comprise: agreeing in advance, with the second-party entity, on information elements for specifying policies to be used by the first-party entity; and wherein at least one instruction indicates said at least one attribute value by using said information elements, and said performing further comprises: parsing the at least one instruction which indicates said at least one attribute value into an executable command; and performing the executable command.

The agreed information elements may comprise: a SON and/or non-SON function list to be coordinated by the first-party entity; a set of attributes for a SON or non-SON function in the SON and/or non-SON function list; and sets of events, conditions and actions for the communication network.

In some embodiments, the first-party entity is configured for self-organizing network (SON) coordination function (SCF), and the first-party entity is in a network management system, an element management system, or a base station.

In a second aspect of the invention, there is provided a method for use by a second-party entity within a communication network. The method may comprise: sending, via an Operation Administration and Maintenance (OAM) interface, at least one instruction to a first-party entity within the communication network, wherein said first-party entity is configured for SON and/or non-SON function coordination and said at least one instruction indicates at least one policy to be used by the first-party entity to coordinate SON and/or non-SON functions.

In one embodiment, the method may further comprise: receiving, prior to sending the at least one instruction, a set of policies from the first-party entity; and choosing to configure at least one policy from the set of policies; and wherein one of the at least one instruction indicates the chosen at least one policy.

Further, the method may comprise: choosing to configure multiple policies from the set of policies; and wherein the one of the at least one instruction further indicates weights for each policy of the multiple policies.

Additionally, the method may comprise: configuring at least one attribute value for at least one of the chosen policies; and wherein one of the at least one instruction indicates said at least one attribute value.

In another embodiment, the method may further comprise: agreeing in advance, with the first-party entity, information elements for specifying policies to be used by the first-party entity; and wherein one of said at least one instruction indicates at least one policy by using said information elements.

In yet another embodiment, the method may further comprise: agreeing in advance, with the first-party entity, information elements for specifying policies to be used by the first-party entity; and wherein said at least one attribute value is indicated by using said information elements.

In a third aspect of the invention, there is provided a first-party apparatus within a communication network. The first-party apparatus may be configured for self-organizing network (SON) and/or non-SON function coordination, and comprise: at least one processor, and at least one memory including computer program code, wherein the at least one memory and the computer program code configured to, with the at least one processor, cause the first-party apparatus at least to perform: receiving, via an Operation Administration and Maintenance (OAM) interface, at least one instruction from a second-party entity within the communication network, wherein the at least one instruction indicates at least one policy to be used for the SON and/or non-SON function coordination; and performing the SON and/or non-SON function coordination based on the at least one policy.

In a fourth aspect of the invention, there is provided a second-party apparatus within a communication network. The second-party apparatus may comprise: at least one processor, and at least one memory including computer program code, wherein the at least one memory and the computer program code configured to, with the at least one processor, cause the second-party apparatus at least to perform: sending, via an Operation Administration and Maintenance (OAM) interface, at least one instruction to a first-party entity within the communication network, wherein said first-party entity is configured for self-organizing network (SON) and/or non-SON function coordination and said at least one instruction indicates at least one policy to be used by the first-party entity to coordinate SON and/or non-SON functions.

In a fifth aspect of the invention, there is also provided an apparatus for use by a first-party entity within a communication network, wherein the first-party entity is configured for self-organizing network (SON) and/or non-SON function coordination. The apparatus may comprise: means for receiving, via an Operation Administration and Maintenance (OAM) interface, at least one instruction from a second-party entity within the communication network, wherein the at least one instruction indicates at least one policy to be used for the SON and/or non-SON function coordination; and means for performing the SON and/or non-SON function coordination based on the at least one policy.

In a sixth aspect of the invention, there is also provided an apparatus for use by a second-party entity within a communication network. The apparatus may comprise: means for sending, via an Operation Administration and Maintenance (OAM) interface, at least one instruction to a first-party entity within the communication network, wherein said first-party entity is configured for self-organizing network (SON) and/or non-SON function coordination and said at least one instruction indicates at least one policy to be used by the first-party entity to coordinate SON and/or non-SON functions.

In a seventh aspect of the invention, there is provided a computer-readable storage media having computer program code stored thereon, the computer program code configured to, when executed, cause an apparatus to perform actions in the method according to any one of embodiments of the first aspect or any one of embodiments of the second aspect of the present invention.

In a eighth aspect of the present invention, there is provided a computer program product comprising a computer-readable storage media according to the seventh aspect of the present invention.

Particular embodiments of the subject matter described in this specification can be implemented so as to realize one or more of the following advantages.

With particular embodiments of the techniques described in this specification, solutions for a second-party (e.g., operators) entity to control and manage a first-party (e.g., vendors) entity have been provided. The first-party entity may be a SON coordination function (SCF). By using the control method, the SCF is ensured to make coordination decisions on interacting SON functions so that the second-party's requirement is achieved, even if the internal logic of the SCF is still not visible to the second-party. The proposed solutions may be applied in both the common SON coordination solution and the coordination solutions specific to different SON function conflicting cases.

Other features and advantages of the embodiments of the present invention will also be understood from the following description of specific embodiments when read in conjunction with the accompanying drawings, which illustrate, by way of example, the principles of embodiments of the present invention.

BRIEF DESCRIPTION OF THE DRAWINGS

The above and other aspects, features, and benefits of various embodiments of the invention will become more fully apparent, by way of example, from the following detailed description and the accompanying drawings, in which.

Like reference numbers and designations in the various drawings indicate like elements.

DETAILED DESCRIPTION OF EMBODIMENTS

Hereinafter, the principle and spirit of the present invention will be described with reference to the illustrative embodiments. It should be understood, all these embodiments are given merely for the skilled in the art to better understand and further practice the present invention, but not for limiting the scope of the present invention. For example, features illustrated or described as part of one embodiment may be used with another embodiment to yield still a further embodiment. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Please be noted that, although embodiments of the present invention will be described hereinafter in the context of a SON Coordination Function (SCF), the principle of the present invention may be applied in any network where a network function coordination function is needed.

Figure 1:
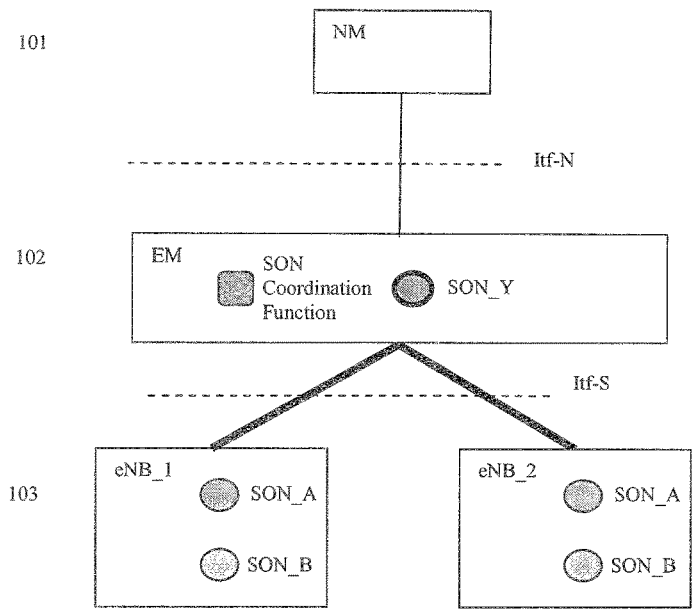
FIG. 1 illustrates an example of SON coordination function at EM level.

Before describing exemplary embodiments of the present invention, reference is made to FIG. 1 which illustrates a network management structure.

As shown in FIG. 1, the network management structure consists of three levels: Network Manager (NM) level 101, Element Manager (EM) level 102, and Network Element (NE, e.g., eNB) level 103. The NM level 101 is connected to the EM level 102 via an N interface Ift-N, and the EM level 102 is connected to the NE level 103 via an EM interface Itf-S. Two or more EM entities may be connected via a P2P interface (not shown), and two or more NE entities (e.g., eNB_1, eNB_2) may be connected, e.g. in case of LTE via an X2 interface. SON functions may be present in any level of the three levels. Also, the SON coordination function (SCF) entity may be present in any level of the three levels.

FIG. 1 shows an example of an SCF entity at the EM level. The SCF entity may be responsible to coordinate the SON function A, B from the same and/or different eNBs. Supposing based on the 3GPP adopted common SON coordination solution, for instance, when the SCF entity receives a request of SON-A from the eNB_1 and a request of SON-B from the eNB_2, and the EM entity at the EM level 102 is preparing to execute SONY at the EM level, within the context that the SON A, SON_B, and SONY have different priorities, different impact levels to performance (e.g., the target of the SON), and different granularities of impact areas, so what kind of result can be expected from the SCF when receiving these requests?

The SON function with highest priority will be permitted?

The SON function with most promising impact to the network performance will be permitted?

The SON function with smallest/biggest/most urgent impact areas will be permitted?

Is it allowed to change parameters values by the SCF?

How to properly direct the SCFs (e.g., even the SCFs are from different vendors) in different EMs/NEs and even in NM under the NM of a same operator, so that the same operational requirement is achieved by those SCFs?

And so on.

Currently, there is no Itf-N interface or other Operation Administration and Maintenance (OAM) interface support for a second-party (e.g., an operator) at the NM level 101 to direct a first-party SCF at the EM/NE-level or even at the NM level but designed by other party, to make decisions according to the specific requirement of the operator.

Therefore, one of the aims of the present invention is to provide a solution where a first-party (e.g., vendors) entity may be controlled by a second-party (e.g., operators) entity. The first-party entity may be configured for network function coordination, for example, SON coordination function, and the internal logic of the network function coordination is unknown to the second-party entity.

Figure 2:
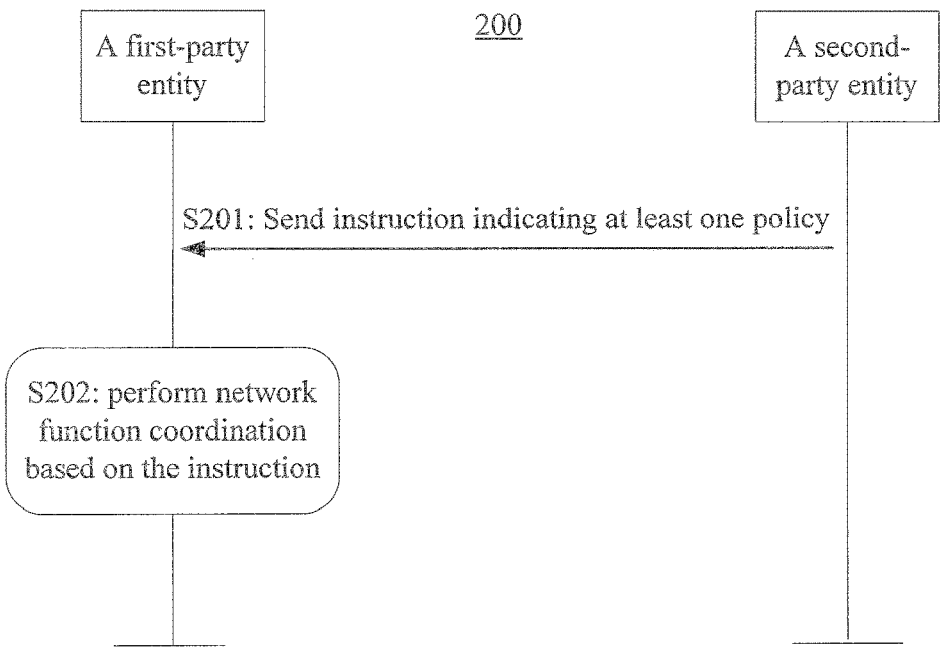
FIG. 2 illustrates an example signal flow 200 illustrating the general concept for a second-party entity to control a first-party entity according to embodiments of the present invention.

FIG. 2 shows an example signal flow 200 illustrating the general concept for a second-party entity to control a first-party entity according to embodiments of the present invention.

The first-party entity may be a vendor-specific SON coordination function (SCF). Hereinafter, for brevity and convenience, the first-party entity and the SCF entity are used interchangeable. As mentioned above, the SCF entity may be present in any level of the NM, EM, and NE levels. The second-party entity may be an operator entity (human or system) which is normally present in the NM level (i.e., an NM entity). The internal logic of the SCF entity may be unknown to the second-party entity. The skilled could appreciate that the SCF may be the 3GPP adopted common SON coordination solution or any other coordination solutions specific to different SON function conflicting cases.

As shown in FIG. 2, at step S201, the second-party entity can send, via an OAM interface, at least one instruction to the SCF entity. The at least one instruction indicate at least one policy the second-party entity wishes the SCF entity to use for its network function coordination.

Depending on the location of the SCF entity, different OAM interfaces may be used. For example, if the SCF entity is present in the EM level, the N interface Itf-N may be used. If the SCF entity is present in the NE level, logically the instructions may be sent from the NM entity via the EM to the SCF entity in the NE level. Physically, the instructions may be sent via the Itf-N to the EM and to the SCF entity. Alternatively, there may be a direct physical interface between the NM entity and the NE entity (e.g., eNB) and an EM logic resides within the eNB.

Upon receiving the at least one instruction from the second-party entity, at step S202, the SCF entity may perform its network function coordination based on the at least one policy indicated in the instructions.

With this policy based coordination, the SCF can be flexible to adapt the requirement from the second-party. In order for the SCF to understand the requirement of the second-party and to make coordination decisions aligning with the requirement, there are several alternatives for the second-party to set, configure and/or change the policy for SON function coordination.

Figure 3:
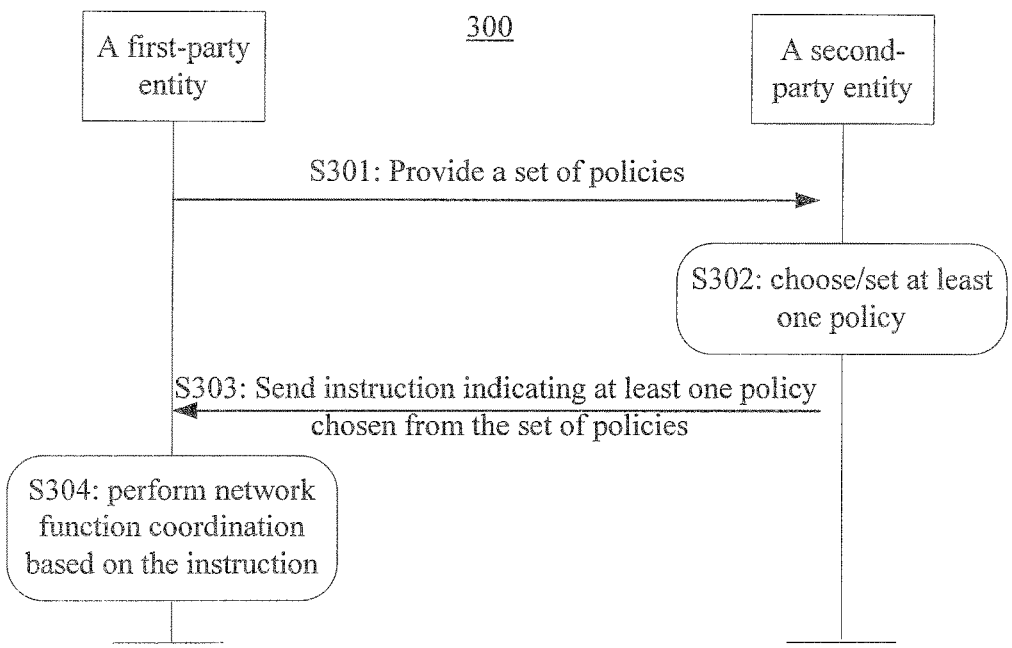
FIG. 3 illustrates an example signal flow 300 for a second-party entity to control a first-party entity according to a first embodiment of the present invention.

FIG. 3 illustrates an example signal flow 300 for a second-party entity to control a first-party entity according to a first embodiment of the present invention.

As shown in FIG. 3, at step S301, the first-party entity (the SCF entity) may provide, beforehand, a set of policies or a list of policies to the second-party entity for choosing to configure.

In one embodiment, the set of policies may be presented by the SCF entity to the second-party entity through an OAM interface, such as Itf-N or human interface. For example, the SCF entity may send the set of policies each time the second-party entity needs to control the coordination. Alternatively, the SCF entity may send the set of policies only once, for example when initiating, unless further required by the second-party entity.

In another embodiment, the set of policies may be presented to the second-party entity by any possible means, such as through configuration to the second-party entity by the operator. The skilled in the art could easily envisage other manners to provide the set of policies to the second-party entity, and the present invention has no limitation in this regard.

Then, at step S302, the second-party entity can choose/set at least one specific policy for the SCF before and during network operation.

In one embodiment, the second-party entity can simply choose at least one policy from the provided set of policies. Thus, the policy value may be a scalar.

In another embodiment, when the second-party entity chooses multiple policies from the set of policies, weights for each policy of the multiple policies may be further indicated. In this case, the policy value may be a vector of (weight, scalar), wherein the weight is a relative value that would imply the second-party's importance given to the policy indicated by the corresponding scalar.

In yet another embodiment, the second-party entity may further instantiate at least one chosen policy. For example, at least one attribute value of a chosen policy may be provided specifically by the second-party entity. In such case, the set of policies provided beforehand may also include options of the attribute value for the second-party entity to choose.

Here are a few example policy clauses that may be presented to the second-party entity by the SCF entity:
Following the priority in sequence
Address the SON function with most promising impact on performance
Address the SON function with smallest/biggest/urgent impact areas
Combination of above factors with respective weight
All/disallow SCF to change a configuration parameter
And so on.

Having chosen or set one or more policies, at step S303, the second-party entity may send, via the OAM interface as described with reference to FIG. 2, at least one instruction to the SCF entity. The at least one instruction may indicate at least one policy chosen from the set of policies. Alternatively, when multiple policies are chosen, the instruction may further indicate the weights for each policy of the multiple policies. In one embodiment, the at least one instruction may further indicate at least one attribute value configured for at least one of the chosen policies.

Upon receiving the at least one instruction from the second-party entity, at step S304, the SCF entity may perform its network function coordination based on the at least one policy indicated in the instruction. Because the indicated policy is chosen from the set of policies provided by the SCF entity, the SCF entity can understand the requirement of the second-party entity and make its coordination decisions accordingly, for example according to the weights associated with each chosen policy. Of course, if the second-party entity has not chosen/set any policy, the SCF entity will use a default policy or policy set to perform SON function coordination.

The first embodiment of the present invention thus has provided a simple and direct way for the second-party entity to control the first-party entity. Normally, the policies in the provided set of policies are common for all events in the network, and thus the SCF entity has more flexibility.

Figure 4:
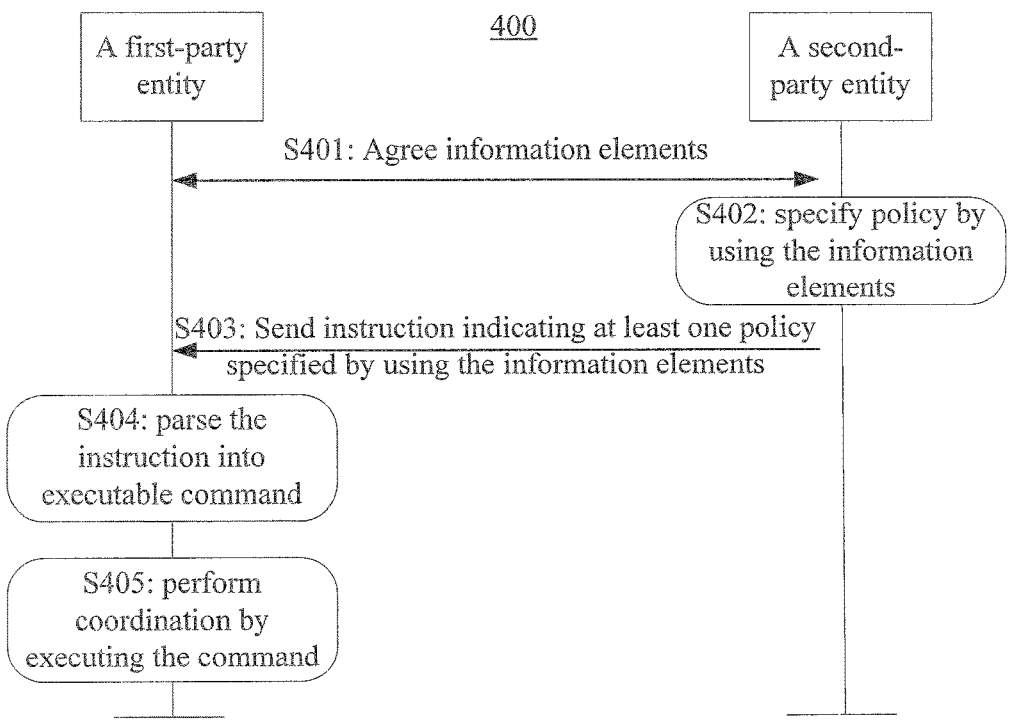
FIG. 4 illustrates an example signal flow 400 for a second-party entity to control a first-party entity according to a second embodiment of the present invention.

FIG. 4 illustrates an example signal flow 400 for a second-party entity to control a first-party entity according to a second embodiment of the present invention.

Different from the first embodiment, the first-party entity and the second-party entity agree, in advance, on information elements for specifying policies or coordination logic to be used by the first-party entity, such that the first-party entity is able to understand and parse policies or logic specified through the agreed information elements by the second-party entity into its corresponding executable command.

As shown in FIG. 4, at step S401, the first-party entity (the SCF entity) may agree in advance, with the second-party entity, on information elements for specifying policy set and/or coordination logic consisting of policy clauses.

The agreed information elements may comprise for example the names of the functions in a SON and/or non-SON function list to be coordinated by the first-party entity, and a set of attributes or function instances for a function in the SON and/or non-SON function list. For example, the agreed set of SON functions may comprise: physical cell identifier (PCI), automated neighbor relation (ANR), inter-cell interference Coordination (ICIC), mobility robustness optimization (MRO), Mobility Load Balancing (MLB), Coverage & Capacity Optimization (CCO), Cell Outage Detection (COD), Cell Outage Compensation (COC), Minimization of Drive Tests (MDT), etc. The detail of each SON function as listed above is not the focus of the present invention, and thus the description thereof is omitted here.

The attributes or instances of a SON or non-SON function may comprise, for example, a function name of the instance, a target area of the instance that the SON or non-SON function is to work for, an impact time of the instance when an action is taken by the function, an impact area of the instance when an action is taken by the function, and the SCF that coordinates the instance, wherein an area can consist of more or more managed objects by the instance.

Further, the agreed information elements may comprise sets of events, conditions, and actions for the network concerning the SON and/or non-SON function list. Here, an event can be of any relevant event appears during a network operation. A condition can be of any relevant condition that may be applied to a network operation. An action can be of any relevant action that may be taken to a network operation. The event set, condition set, and action set can be defined separately from each other. Through linking a specific event and a specific action under a specific condition, a policy may be defined or generated. In other words, by organizing Events, Conditions and Actions (ECAs), policy clauses may be generated to specify the coordination logic/policy.

Here is a simple example to show how it may work. Assume the agreed set of ECAs for the network concerning a set of SON functions are the following:

The agreed set of SON function concerned: PCI, ANR, ICI, MRO, MLB, CCO, COD, COC, MDT, etc.
The agreed set of events could be:
Event 1: Coverage is below a pre-configured level
Event 2: Quality is below a pre-configured level
Etc.
Where the coverage and quality need to be defined concerning how they are measured.
The agreed set of conditions could be:
The coverage area where an event is generated
The group of managed objects where an event is generated
Etc.
The agreed set of actions could be:
Allow any function—means that any relevant function is allowed to run for an envisioned problem
Assign a priority to a function—means that the indicated function is assigned with the given priority
Set a constrain for an action—means that the indicated action can have effect only within the constrain
Etc.

Going on with FIG. 4, having agreed on the information elements, at step S402, the second-party entity can specify its coordination policy set/coordination logic by using the information elements.

Here is an example of coordination logic specified by the second-party entity based on the above exemplary agreed information elements. Coordination is performed according to the following logic in case of Event 1 and Event 2.

Event 1: Coverage is below a pre-configured level
Condition 1-1: if the area of measurement is a rural area
Action 1-1: Allow any SON function under constrain that would improve the coverage of the area
Condition 1-2: if the area of the measurement is a hot spot
Action 1-2: Assign function MLB the highest priority under constrain "for the area"
Condition 1-3: if the area of the measurement is the other area
Action 1-3: Assign function COD/COC the highest priority under constrain "for the area"
Event 2: Quality is below a pre-configured level
Condition 2-1: if the area of measurement is a rural area
Action 2-1: Allow any SON function under constrain that would improve the quality of the area
Condition 2-2: if the area of the measurement is a hot spot
Action 2-2: Assign function MRO the highest priority under constrain "for the area"
Condition 2-3: if the area of the measurement is the other area
Action 1-3: Assign function COC the highest priority under constrain "for the area Return to FIG. 4, at step S403, the second-party entity can send one or more instructions, via the OAM interface as described above, to indicate at least one policy by using the agreed information elements. The at least one policy may be coordination logic consisting of policy clauses which are constructed based on the agreed information elements as illustrated above.

Then, upon receiving the one or more instructions from the second-party entity, at step S404, the SCF entity can parse the one or more instruction into its corresponding executable commands.

Proceeding with the above example, the SCF entity can parse the exemplary policy/coordination logic into its executable commands as blow.

When coverage-related events,
if it is for cell 1~100, coordinate by allow any SON function that would improve the coverage of the area;
if it is for cell 310~330, coordinate by assigning MLB the highest priority;
if it is for cell 200~300, coordinate by assigning COD/COC the highest priority;
else, coordinate with own default coordination logic.
When quality-related events,
if it is for cell 1~100, coordinate by allow any SON function that would improve the quality of the area;
if it is for cell 310~330, coordinate by assigning MRO the highest priority;
if it is for cell 200~300, coordinate by assigning CCO the highest priority;
else, coordinate with own default coordination logic.
Else, coordinate with own default coordination logic.

After the parsing, at step S405, the SCF entity can perform SON and/or non-SON function coordination by executing the commands, which will follow the coordination logic provided by the second-party.

In the second embodiment, the first-party entity works with the capability of "parsing" a second-party specified policy set or coordination logic into its corresponding executable code and data to run on the platform. The second embodiment of the present invention thus has provided a more complex manner but of more control for the second-party entity to control/manage the first-party entity. For example, the second-party entity can specify a set of detail coordination policies to direct the coordination of the first-party entity. In the specified policies, various events for the network may be defined, and for a certain event, different conditions and actions taken under the conditions may be defined. Therefore, the second-party entity can further control the SCF entity.

Considering the advantages of the first and second embodiments, in a third embodiment of the present invention, the first and the second embodiments may be combined. In such embodiment, the first-party can both present a set of policies to the second-party entity and agree with the second-party entity on information elements for specifying coordination policies.

In one implement, the second-party entity can choose at least one policy from the set of policies provided by the first-party entity. The policy value may be set as described with reference to FIG. 3. In addition, when informed by the first-party entity or on its own initiative, the second-party entity can specify further policies by using the agreed information elements when needed. The policy chosen from the set of policies and the policy specified by the agreed information elements may be indicated separately in different instructions. Thus, when the first-party entity receives these instructions, it can parse the instruction which uses the agreed information elements into an executable command. For the instruction indicating the policy chosen from the set of policy, the first-party entity can execute it directly.

In another implement, the second-party entity can choose at least one policy from the set of policies provided by the first-party entity. The policy value may be set as described with reference to FIG. 3. In addition, when at least one attribute or instance for at least one of the chosen policies is required to be specified by the second-party entity, the second-party entity can specify the at least one attribute by using the agreed information elements. In this case, one or more policies chosen/configured/set by the second-party entity may be indicated in different instructions or in a same instruction. Thus, when the first-party entity receives such instructions, it needs to parse the instruction or part of the instruction which uses the agreed information elements into an executable command.

By combining the first and second embodiments of the present invention, a more comprehensive coordination policy/logic may be defined. Normally it is hard to include all events in the network by using the agreed information elements, and for the events undefined in the logic, one or more policies chosen from the provided set of policies may be applied.

The following implementation examples show in the typical format of a 3GPP 32.series on how the proposed solutions can be realized. Modeling of a set of object classes as follows is preferred.

For example, for the first embodiment, a new Information Object Class (IOC, e.g., the name may be SonCoordinationPolicyControl) may be created to model the policy for SON coordination in 3GPP TS 32.762 or 32.522 with the following attributes. Alternatively, the following attributes may be added to SubNetwork IOC in 3GPP TS 32.622, or EnbFunction or EUtranGenericCell IOC in 32.762.

In the variant with the new IOC, the IOC would be contained in IOC Subnetwork, EnbFunction or EUtranGenericCell.

| Attribute | Definition | Legal Values |
| --- | --- | --- |
| SonCoordinationPolicy Set | It identifies the policy set for SON coordination. | List of SonCoordination Policy, each entry consisting of { i) SonCoordinationPolicy: ENUM of (HigherPriorityExecuteFirst, LowerPerformanceToTargetExecuteFirst, SmallerImpactedAreasExecuteFirst, BiggerImpactedAreasExecuteFirst, CombinationOfAbove); ii) Weight: integer } AllowSCFChangeAttributes: Boolean (yes/no); |

For the second embodiment, the major work here is on the standardized specification of the needed vectors of (event, condition, action) in 3GPP SA5 so that the common coordination solution can be supported. This could be achieved by creating a new IOC (e.g., name is SonCoordinationLogic) to model the SON coordination logic in 32.762 or 32.522 with the following attributes, or add the following attributes to SubNetwork IOC in 32.622 or EUtranGenericCell IOC in 32.762.

In the variant with the new IOC, the IOC would be contained in IOC Subnetwork, EnbFunction or EUtranGenericCell.

| Attribute | Definition | Legal Values |
| --- | --- | --- |
| SonCoordinationLogic | It identifies the logic for SON coordination. | List of Structure { SON_function_name (string) target_area (a set of MO (managed object)) event (a set of events agreed between vendor (or third-party) and operator) condition (a set of conditions agreed between vendor (or third-party) and operator) action (a set of actions agreed between vendor (or third-party) and operator) |

For the third embodiment, it can contain both models for the first and second embodiments.

Thus, embodiments of the present invention have proposed methods for a second-party (e.g., operator), via an OAM interface like Itf-N or human interface, to control and manage a first-party (e.g., vendor) SCF, to ensure that the SCF makes coordination decisions on interacting SON functions according to the operator's requirements, even if the internal logic of the SCF is still not visible to the operator.

Figure 5:
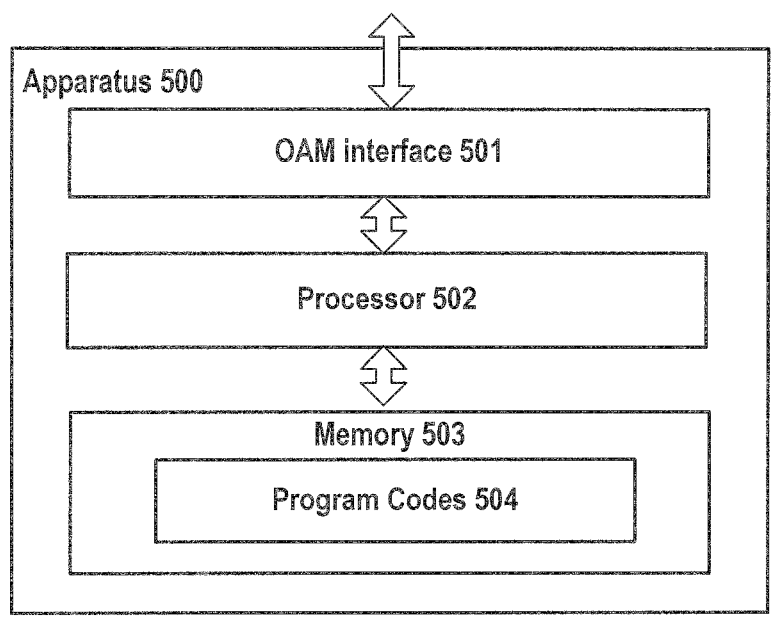
FIG. 5 illustrates a schematic block diagram of an apparatus 500 that may be configured to practice example embodiments of the present invention.

FIG. 5 is a schematic block diagram of an apparatus 500 that may be configured to practice example embodiments of the present invention.

As shown in FIG. 5, the apparatus 500 may comprise an OAM interface module 501, e.g., an N interface Itf-N; at least one processor 502; and at least one memory 503 including computer program codes 504. The at least one memory and the computer program codes can be configured to, with the at least one processor, cause the apparatus to at least perform the methods as illustrated with reference to FIGS. 2-4.

Specifically, in one implementation, the apparatus 500 may be configured as a first-party (e.g., vendor or other parties) entity in a communication network for SON and/or non-SON function coordination, such as an SCF entity. The SCF may reside in a network management system, an element management system, a separate SON server, or a base station. In other words, the first-party entity may be in a network management system/separate SON server, an element management system/separate SON server, or a base station.

In this implementation, the apparatus 500 may be caused to perform operations of the first-party entity. For example, the apparatus 500 may be configured to: receive, via an Operation Administration and Maintenance (OAM) interface, at least one instruction from a second-party entity within the communication network, wherein the at least one instruction indicates at least one policy to be used for the SON and/or non-SON function coordination; and perform the SON and/or non-SON function coordination based on the at least one policy. Other operations performed by the apparatus 500 can reference the above description with respect to FIGS. 2-4, where various operations of the first-party entity have been described in detail, and thus the description thereof is omitted herein.

In another implementation, the apparatus 500 may be configured as a second-party (e.g., operator) entity in a communication network for control of the SON and/or non-SON function coordination. The second-party entity may reside in the NM level as an NM entity.

In such implementation, the apparatus 500 may be caused to perform operation of the second-party entity. For example, the apparatus 500 may be configured to send, via an Operation Administration and Maintenance (OAM) interface, at least one instruction to a first-party entity within the communication network, wherein the first-party entity is configured for SON and/or non-SON function coordination and the at least one instruction indicates at least one policy to be used by the first-party entity to coordinate SON and/or non-SON functions. Other operations performed by the apparatus 500 can reference the above description with respect to FIGS. 2-4, where various operations of the second-party entity have been described in detail, and thus the description thereof is omitted herein.

Embodiments of the present invention have also provided apparatuses comprising means for performing each step as illustrated in conjunction with FIGS. 2-4. Therefore, for detailed operations of respective means in these apparatuses, please refer to the previous descriptions of the methods of the present invention with reference to FIGS. 2-4.

The present invention also provided a computer-readable storage media having computer program code stored thereon, the computer program code configured to, when executed, cause an apparatus to perform actions in the method as described hereinbefore. Further, there is provided a computer program product comprising a computer-readable storage media as provided in the present invention.

Example embodiments of the present invention have been described above with reference to block diagrams and flowchart illustrations of methods, apparatuses (i.e., systems). It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

The foregoing computer program instructions can be, for example, sub-routines and/or functions. A computer program product in one embodiment of the invention comprises at least one computer readable storage medium, on which the foregoing computer program instructions are stored. The computer readable storage medium can be, for example, an optical compact disk or an electronic memory device like a RAM (random access memory) or a ROM (read only memory).

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It should also be noted that the above described embodiments are given for describing rather than limiting the invention, and it is to be understood that modifications and variations may be resorted to without departing from the spirit and scope of the invention as those skilled in the art readily understand. Such modifications and variations are considered to be within the scope of the invention and the appended claims. The protection scope of the invention is defined by the accompanying claims. In addition, any of the reference numerals in the claims should not be interpreted as a limitation to the claims. Use of the verb "comprise" and its conjugations does not exclude the presence of elements or steps other than those stated in a claim. The indefinite article "a" or "an" preceding an element or step does not exclude the presence of a plurality of such elements or steps.

What is claimed is:

1. A method for use by a first-party entity at an element manager level or a network element level within a communication network, wherein said first-party entity is configured for at least one of a self-organizing network (SON) or a non-SON function coordination, said method comprising:
    receiving, via an Operation Administration and Maintenance (OAM) interface, at least one instruction from a second-party entity at a network manager level within the communication network, wherein the at least one instruction indicates at least one coordination policy to be used for the at least one of the SON or the non-SON function coordination; and
    performing by the first-party entity the at least one of the SON or the non-SON function coordination based on the at least one coordination policy,
    wherein the at least one instruction indicates at least one coordination policy chosen from a set of SON or non-SON function coordination policies provided, prior to receiving the at least one instruction, to the second-party entity allowing the second-party entity to select the at least one coordination policy for the first-party entity.

2. The method of claim 1, wherein when the at least one instruction indicates multiple policies, it further indicates weights for each of the multiple policies.

3. The method of claim 1, wherein the at least one instruction further indicates at least one attribute value configured for the at least one of the chosen policy.

4. The method of claim 1, further comprising:
    agreeing in advance, with the second-party entity, on information elements for specifying the set of SON or non-SON function coordination policies to be used by the first-party entity, wherein one of said at least one instruction indicates the at least one coordination policy by using said information elements, and said performing further comprising:
    parsing the at least one instruction which uses said information elements into an executable command; and
    performing the executable command.

5. The method of claim 3, further comprising:
agreeing in advance, with the second-party entity, on information elements for specifying the set of SON or non-SON function coordination policies to be used by the first-party entity, wherein the at least one instruction indicates said at least one attribute value by using said information elements, and said performing further comprises:
parsing the at least one instruction which indicates said at least one attribute value into an executable command; and
performing the executable command.

6. The method of claim 4, wherein said information elements comprise:
one of a SON or a non-SON function list to be coordinated by the first-party entity;
a set of attributes for the SON or the non-SON coordination function in the one of the SON or the non-SON function list; and
sets of events, conditions, and actions for the communication network.

7. The method of claim 1, wherein said first-party entity is configured for an SON coordination function (SCF), and said first-party entity is in a network management system, an element management system, or a base station.

8. A non-transitory computer-readable storage medium having computer program code stored thereon, the computer program code configured to, when executed, cause an apparatus to perform actions in the method according to claim 1.

9. A computer program product comprising the non-transitory computer-readable storage medium according to claim 8.

10. The method according to claim 1, wherein the at least one coordination policy comprises at least one of prioritizing in sequence according to a priority of the at least one SON function, address the at least one SON function with the most impact on performance, address the at least one SON function with a smallest, biggest, or urgent impact areas, or disallow as SON coordination function to change a configuration parameter of the at least one SON function.

11. A method for use by a second-party entity at a network manager level within a communication network, comprising:
sending from the second-party entity, via an Operation Administration and Maintenance (OAM) interface, at least one instruction to a first-party entity at an element manager level or a network element level within the communication network, wherein said first-party entity is configured for at least one of a self-organizing network (SON) or a non-SON function coordination and said at least one instruction indicates at least one coordination policy to be used by the first-party entity to coordinate the at least one of the SON function or the non-SON function;
receiving at the second-party entity, prior to sending the at least one instruction, a set of SON or non-SON function coordination policies from the first-party entity; and
choosing to configure the at least one coordination policy from the set of policies, wherein one of the at least one instruction indicates the chosen at least one coordination policy.

12. The method of claim 11, further comprising:
choosing to configure multiple policies from the set of SON or non-SON function coordination policies wherein the one of the at least one instruction further indicates weights for each of the multiple policies.

13. The method of claim 11, further comprising:
configuring at least one attribute value for the at least one of the chosen coordination policy, wherein the one of the at least one instruction indicates said at least one attribute value.

14. The method of claim 11, further comprising:
agreeing in advance, with the first-party entity, on information elements for specifying the set of SON or non-SON function coordination policies to be used by the first-party entity, wherein one of said at least one instruction indicates the at least one coordination policy by using said information elements.

15. The method of claim 13, further comprising:
agreeing in advance, with the first-party entity, on information elements for specifying the set of SON or non-SON function coordination policies to be used by the first-party entity, wherein said at least one attribute value is indicated by using said information elements.

16. The method of claim 14, wherein said information elements comprise:
one of a SON or a non-SON function list to be coordinated by the first-party entity; and
a set of attributes for the SON or the non-SON coordination function in the one of the SON or the non-SON function list; and
sets of events, conditions, and actions for the communication network.

17. A non-transitory computer-readable storage medium having computer program code stored thereon, the computer program code configured to, when executed, cause an apparatus to perform actions in the method according to claim 11.

18. A computer program product comprising the non-transitory computer-readable storage medium according to claim 17.

19. The method according to claim 11, wherein the at least one coordination policy comprises at least one of prioritizing in sequence according to a priority of the at least one SON function, address the at least one SON function with the most impact on performance, address the at least one SON function with a smallest, biggest, or urgent impact areas, or disallow an SON coordination function to change a configuration parameter of the at least one SON function.

20. A first-party apparatus at an element manager level or a network element level within a communication network, wherein said first-party apparatus is configured for at least one of a self-organizing network (SON) or a non-SON function coordination, said first-party apparatus comprising:
at least one processor, and
at least one memory including computer program code, wherein the at least one memory and the computer program code configure the at least one processor to:
receive, via an Operation Administration and Maintenance (OAM) interface, at least one instruction from a second-party entity at a network manager level within the communication network, wherein the at least one instruction indicates at least one coordination policy to be used for the at least one of the SON and the non-SON function coordination; and
perform the SON or the non-SON function coordination based on the at least one coordination policy,
wherein the at least one instruction indicates at least one coordination policy chosen from a set of SON or non-SON function coordination policies provided, prior to receiving the at least one instruction, to the second-party entity allowing the second-party entity to select the at least one coordination policy for the first-party apparatus.

21. The apparatus of claim 20, wherein when the at least one instruction indicates multiple policies, it further indicates weights for each of the multiple policies.

22. The apparatus of claim 20, wherein the at least one instruction further indicates at least one attribute value configured for the at least one of the chosen policy.

23. The apparatus of claim 20, wherein the at least one memory and the computer program code configure the at least one processor to:
agree in advance, with the second-party entity, on information elements for specifying the set of SON or non-SON function coordination policies to be used by the first-party apparatus, wherein one of said at least one instruction indicates the at least one coordination policy by using said information elements, and said performing of the at least one of the SON function or the non-SON function coordination further comprising:
parse the at least one instruction which uses said information elements into an executable command; and
perform the executable command.

24. The apparatus of claim 22, wherein the at least one memory and the computer program code configure the at least one processor to:
agree in advance, with the second-party entity, on information elements for specifying the set of SON or non-SON function coordination policies to be used by the first-party apparatus, wherein the at least one instruction indicates said at least one attribute value by using said information elements, and said performing of the at least one of the SON function and the non-SON function coordination further comprises:
parse the at least one instruction which indicates said at least one attribute value into an executable command; and
perform the executable command.

25. The apparatus of claim 23, wherein said information elements comprise:
one of a SON or a non-SON function list to be coordinated by the first-party entity; and
a set of attributes for the SON or the non-SON function coordination in the one of the SON or the non-SON function list; and
sets of events, conditions and actions for the communication network.

26. The apparatus of claim 20, wherein said first-party apparatus is configured for an SON coordination function (SCF), and said first-party apparatus is in a network management system, an element management system, or a base station.

27. The first-party apparatus according to claim 20, wherein the at least one coordination policy comprises at least one of prioritizing in sequence according to a priority of the at least one SON function, address the at least one SON function with the most impact on performance, address the at least one SON function with a smallest, biggest, or urgent impact areas, or disallow an SON coordination function to change a configuration parameter of the at least one SON function.

28. A second-party apparatus at a network manager level within a communication network, comprising:
at least one processor, and
at least one memory including computer program code, wherein the at least one memory and the computer program code configure the at least one processor to:
send, via an Operation Administration and Maintenance (OAM) interface, at least one instruction to a first-party entity at an element manager level or a network element level within the communication network, wherein said first-party entity is configured for at least one of a self-organizing network (SON) or a non-SON function coordination and said at least one instruction indicates at least one coordination policy to be used by the first-party entity to coordinate the at least one of the SON function or the non-SON function;
receive, prior to sending the at least one instruction, a set of the SON or the non-SON function coordination policies from the first-party entity; and
choose to configure the at least one coordination policy from the set of policies, wherein one of the at least one instruction indicates the chosen at least one coordination policy.

29. The apparatus of claim 28, wherein the at least one memory and the computer program code configure the at least one processor to:
choose to configure multiple policies from the set of SON or non-SON function coordination policies, wherein the one of the at least one instruction further indicates weights for each of the multiple policies.

30. The apparatus of claim 28, wherein the at least one memory and the computer program code configure the at least one processor to:
configure at least one attribute value for the at least one of the chosen coordination policy, wherein the one of the at least one instruction indicates said at least one attribute value.

31. The apparatus of claim 28, wherein the at least one memory and the computer program code configure the at least one processor to:
agree in advance, with the first-party entity, on information elements for specifying the set of SON or non-SON function coordination policies to be used by the first-party entity, wherein one of said at least one instruction indicates the at least one coordination policy by using said information elements.

32. The apparatus of claim 30, wherein the at least one memory and the computer program code configure the at least one processor to:
agree in advance, with the first-party entity, on information elements for specifying the set of SON or non-SON function coordination policies to be used by the first-party entity, wherein said at least one attribute value is indicated by using said information elements.

33. The apparatus of claim 31, wherein said information elements comprise:
one of a SON or a non-SON function list to be coordinated by the first-party entity; and
a set of attributes for the SON or the non-SON coordination function in the one of the SON or the non-SON function list; and
sets of events, conditions, and actions for the communication network.

34. The second-party apparatus according to claim 28, wherein the at least one coordination policy comprises at least one of prioritizing in sequence according to a priority of the at least one SON function, address the at least one SON function with the most impact on performance, address the at least one SON function with a smallest, biggest, or urgent impact areas, or disallow an SON coordination function to change a configuration parameter of the at least one SON function.

35. An apparatus for use by a first-party entity at an elements manager level or a network element level within a communication network, wherein said first-party entity is configured for at least one of a self-organizing network (SON) or a non-SON function coordination, said apparatus comprising:

means for receiving, via an Operation Administration and Maintenance (OAM) interface, at least one instruction from a second-party entity at a network manager level within the communication network, wherein the at least one instruction indicates at least one coordination policy to be used for the at least one of the SON and the non-SON function coordination; and means for performing by a first-party entity the one of SON and non-SON function coordination based on the at least one coordination policy, wherein the one of the at least one instruction indicates at least one coordination policy chosen from a set of SON or non-SON function coordination policies provided, prior to receiving the at least one instruction, to the second-party entity allowing the second-party entity to select the at least one coordination policy for the first-party entity.

36. An apparatus for use by a second-party entity at a network manager level within a communication network, comprising:

means for sending, via an Operation Administration and Maintenance (OAM) interface, at least one instruction to a first-party entity at an element manager level or a network element level within the communication network, wherein said first-party entity is configured for one of self-organizing network (SON) and non-SON function coordination and said at least one instruction indicates at least one coordination policy to be used by the first-party entity to the coordinate the one of the SON function or the non-SON function, and means for receiving, prior to sending the at least one instruction, a set of SON or non-SON function coordination policies allowing the second-party entity to select the at least one specific policy for the first-party entity, wherein one of the at least one instruction indicates the at least one coordination policy chosen from a set of SON or non-SON function coordination policies received.

* * * * *